June 20, 1967 F. S. NAPOLI 3,327,089
PERFORATED TAPE REEL FEEDER FOR WELD STUDS
Filed Oct. 14, 1963
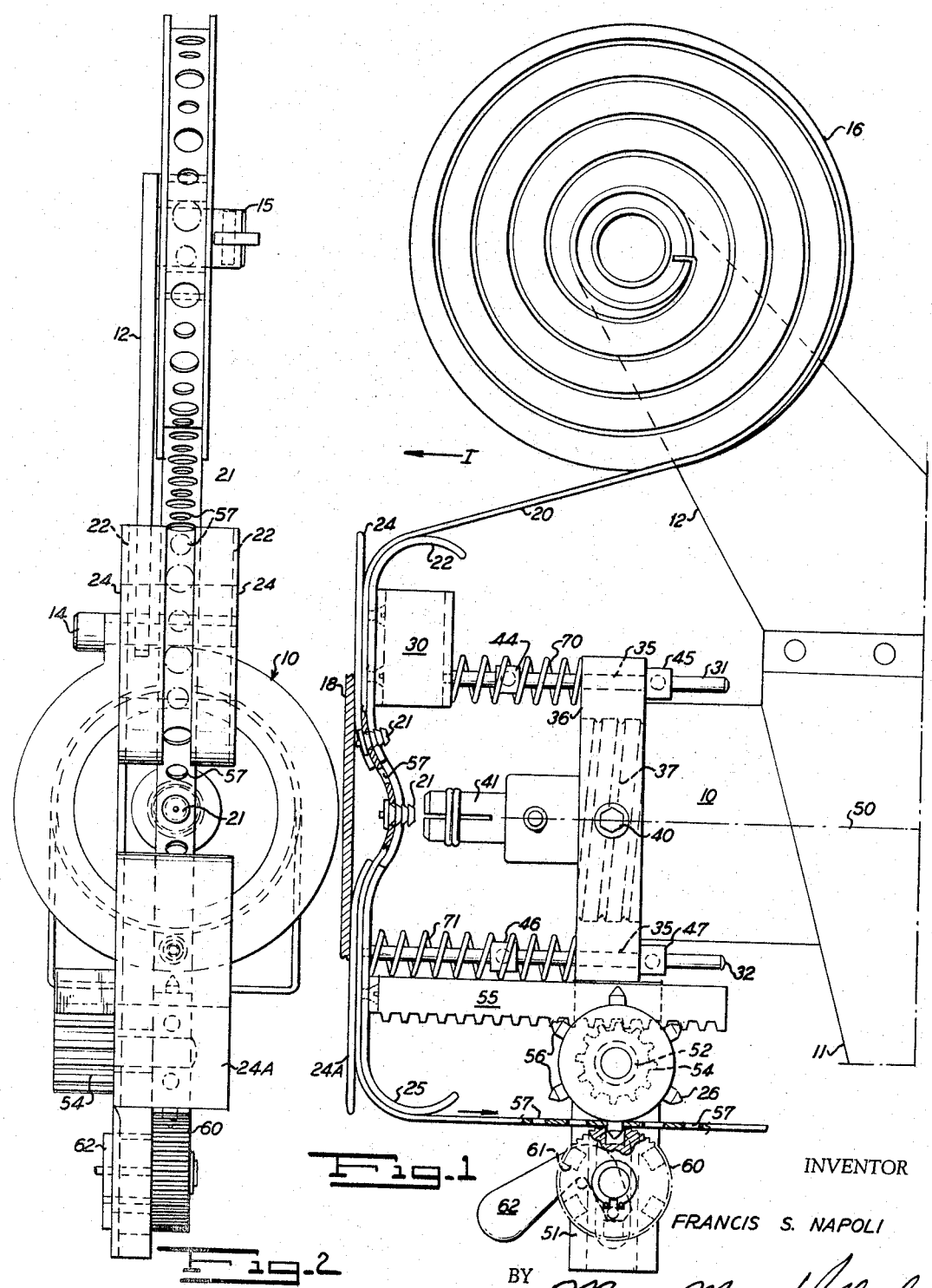
INVENTOR
FRANCIS S. NAPOLI
BY Mason, Mason & Wright
ATTORNEYS

3,327,089
PERFORATED TAPE REEL FEEDER FOR WELD STUDS
Francis S. Napoli, Troy, Mich., assignor to Lattner Bros. Machining Co., Ferndale, Mich., a partnership
Filed Oct. 14, 1963, Ser. No. 316,035
11 Claims. (Cl. 219—98)

This invention relates to apparatus for loading a stud welding unit wherein the welding studs are provided on a tape which is wound on a reel.

The principal object of the invention is to provide an attachment of the type indicated which automatically accomplishes an intermittent movement of the tape to furnish welding studs in alignment with the collet of the welding unit which is adapted to weld such welding studs to a workpiece.

Other objects and advantages of the present invention will be apparent to those skilled in the art upon reference to the following detailed description of a preferred embodiment of the invention and to the attached drawings of which:

FIGURE 1 shows a side view of the tape reel feeder attached to a stud welding unit in accordance with the invention; and FIGURE 2 is a front elevational view of the apparatus shown in FIGURE 1.

In the figures, a conventional stud welding unit is indicated by the reference numeral 10. This unit may be either portable with a handle 11 or, alternatively, supported on standards. Extending upwardly and normally from the welding unit 10 is a bracket 12 which is secured to the welding unit 10 by means of bolts 14 or other suitable securing means. A stub axle 15 is carried on the upper portion of the bracket 12, said axle 15 mounting a reel 16. Reel 16 is of a type well known to the art such as that used for motion picture films and the like.

Wound about reel 16 is a perforated tape 20 which carries a welding stud 21 in every other perforation. Only two of such studs are shown in FIGURE 1, but it will be understood that such studs extend in every other perforation to the end of the tape in reel 16. The tape 20 from the reel 16 first engages the upper arcuate portion of the reel track shoe 22. Reel track shoe 22 comprises two spaced parts which engage the edge of the tape and permit the welding studs 21 to move between them. Secured to the upper reel track shoe 22 is a nosepiece 24 which, similar to the upper reel track shoe 22, comprises two parts which engage the edges of the tape 20, and permit the extending welding studs 21 to pass between them. The nosepiece 24 includes a lower portion designated herein as 24A which is integral. A lower reel track shoe 25 is secured to the lower portion of the nosepiece 24A with a slot being left between the parts 24A and 25 wherein the tape 20 may be led to the sprocket 26. A part 30 bridges the two upper portions of nosepiece 24.

Rigid with the nosepiece 24, the part 30 and the upper and lower reel track shoes 22 and 25 are two parallel rods, the upper rod being designated 31 and the lower rod being designated 32. These rods each are received in bearings 35 which comprise bores through the collar 36, which in turn is secured by threads 37 and lockbolt 40 to the forward portion of the welding unit 10 but aft of the collet 41 extending from said welding unit. Each of the rods 31 and 32 have secured to them a pair of limit members. Accordingly, it will be noted that the upper rod 31 has a forward upper limit member 44 and after upper limit member 45. Similarly, lower rod 32 has a forward lower limit member 46 and after lower limit member 47. The rods 31 and 32 are not only parallel to themselves but also parallel to the longitudinal axis 50 of the collet 41.

It is to be understood that the collet 41 is adapted frictionally to engage the welding studs 21 and to release same after the stud is welded to the workpiece.

A pinion support 51 depends from and is rigid with the collar 36. Carried by said support 51 is a one-way free riding clutch 52 which operatively connects a pinion 54 to the sprocket 26. A rack 55 is rigidly connected to the lower reel track shoe 25 and carries a track which engages the pinion 54. Because of the one-way free riding clutch 52, the sprocket 26 does not turn with the pinion 54 except when the rack is traveling in a direction relative to the welding unit 10, as shown by arrow I in FIGURE 1, in which case the sprocket is moved counterclockwise as seen from FIGURE 1. The sprocket 26 has six pegs 56 which engage every other perforation 57 and, it will be appreciated that with one-sixth of a turn of sprocket 26 in counterclockwise direction, as seen in FIGURE 1, the tape 20 is advanced whereby a new welding stud 21 is aligned with the collet 41. It will be understood that normally perforations 57 are disposed between the perforations which carry studs 21. A knurled pressure wheel 60 is also carried by the pinion support 51 beneath the engagement of the tape 20 whereby the recesses 61 of wheel 60 engage the pegs 56 of sprocket 26. A manual control lever 62 is provided for lowering the wheel 60 for starting the tape.

The upper rod 31 supports a resilient member comprising upper compression spring 70 between the collar 36 and the part 30. In a like manner the lower rod 32 supports a lower compression spring 71 between the collar 36 and the lower reel track shoe 25. Being in compression, springs 70 and 71 are resiliently urging the parts against which they bear apart.

In operation, a reel 16 is mounted on the axle 15 and the tape 20 (which has sufficient leader to permit the positioning of the first welding stud 21 in alignment with the collet 41 and at the same time extend between the sprocket 26 and the pressure wheel 60) is aligned between the nosepiece 24 and part 24A on one side and the reel track shoes 22 and 25 on the other, and the sprocket 26 and wheel 60, as shown in FIGURE 1. The welding unit 10 is then brought to the proximity of a workpiece and the appropriate electrical connections are made as well known in the art. In this connection it will be appreciated that the nosepiece 24 together with its lower part 24A act as part of the ground circuit. With the nosepiece 24 and part 24A against the workpiece, the unit 10 together with the collet 41 are moved forward in the direction indicated by the arrow I in FIGURE 1 and the collet 41 frictionally engages the welding stud 21 which is in alignment therewith. Electrical current then passes through the collet 41 into the welding stud 21 involved which is thereby welded to the workpiece 18, the nosepiece 24 together with the lower part 24A acting as part of the ground circuit. When this is accomplished, the release of force in the direction of arrow I from the welding unit 10 permits the compression springs 70 and 71 to return the welding unit 10 to the position shown in FIGURE 1 whereby the collar 36 bears against the after upper and lower limit members 45 and 47. This relative motion causes the rack 55 through the pinion 54 which is thereby rotated together with the one-way free riding clutch 52, to turn the sprocket 26 one-sixth of a turn and thereby advance the tape 20 so that the next welding stud 21 is aligned with the collet 41 and the operation may be repeated. Thus each time a welding stud 21 is welded onto the workpiece, the succeeding welding stud is aligned with the collet 41 until all of the studs 21 carried by the tape 20 have been used.

The reels 16 may be of various diameters to permit a length of tape to satisfy the requirement in studs for each load. The reels may be composed of metal to be returned on an exchange basis or can be made of plastic, cardboard, or the like, and disposed of after use.

The foregoing detailed description has been given for clearness of understanding only, and no unnecessary limitations should be understood therefrom, for modifications will be obvious to those skilled in the art.

Having thus described my invention, what I claim as new and desire to secure by Letters Patent of the United States is:

1. An apparatus for loading a stud welding unit which comprises a stud holder having a welding electrode adapted frictionally to engage a welding stud and to release said stud after it is welded to a workpiece, a tape, a plurality of welding studs carried by said tape, guide means guiding said tape in front of said electrode, alignment means for moving said tape to a position where one of said welding studs is in alignment with said electrode, said alignment means having parts for engaging the edge of said tape on opposite sides of said electrode, said guide means together with said tape being movable from a first position wherein said welding stud is in front of said electrode to a second position wherein said electrode frictionally engages said welding stud.

2. Apparatus in accordance with claim 1 wherein said tape is perforated.

3. Apparatus in accordance with claim 2 wherein said studs are received in at least some of said perforations.

4. Apparatus in accordance with claim 2 wherein said studs are separated from each other by at least one of said perforations.

5. Apparatus in accordance with claim 1 wherein resilient means is provided for removing said electrode from said welding stud after the same is welded to said workpiece.

6. Apparatus in accordance with claim 1 wherein said alignment means is actuated by movement of said electrode away from said workpiece.

7. In combination with a stud welding unit including stud holding means, apparatus for loading studs therein which comprises guide means movably connected to said unit, a tape, a plurality of welding studs carried by said tape, said guide means guiding said tape in front of said stud holding means, alignment means including parts for engaging the edge of said tape on opposite sides of said stud holding means, selective means connected to said unit, and actuation means associated with said selective means and with said guide means whereby when said guide means moves away from said unit said selective means moves said tape relative to said stud holding means.

8. In combination with a stud welding unit including stud holding means, apparatus for loading studs therein which comprises guide means movably connected to said unit, resilient means urging said guide means away from said unit, a tape member, a plurality of welding studs carried by said tape member, said guide means guiding said tape member in front of said stud holding means, alignment parts for engaging the edge of said tape on either side of said stud holding means, selective means connected to said unit, actuation means associated with said selective means and with said guide means whereby when said guide means is moved by said resilient means away from said unit, said selective means moves said tape member relative to said stud holding means to place a welding stud carried by said tape member in alignment therewith.

9. Apparatus in accordance with claim 8 wherein said tape is perforated.

10. In combination with a stud welding unit including stud holding means, apparatus for loading studs therein which comprises guide means movably connected to said unit, a reel mounted on said unit, tape wound about said reel, said tape carrying a plurality of welding studs, said guide means guiding said tape in front of said stud holding means, selective means connected to said unit, actuation means including parts for engaging the edge of said tape on opposite sides of said stud holding means, being associated with said selective means and with said guide means whereby when said guide means moves away from said unit, said selective means moves said tape from said reel relative to said stud holding means to place a welding stud carried by said tape in alignment with said stud holding means.

11. In combination with a stud welding unit including selective means connected to said unit, apparatus for loading studs therein which comprises a perforated tape, a reel carrying said tape, a plurality of welding studs removably received in the perforations of said tape, at least one open perforation between adjacent studs whereby said selective means cooperates only with the open perforation between adjacent studs.

References Cited

UNITED STATES PATENTS

| 1,410,560 | 3/1922 | Latham | 221—72 X |
| 1,505,152 | 8/1924 | Latham | 221—72 X |
| 2,770,269 | 11/1956 | Austin | 221—72 X |

FOREIGN PATENTS 806,526   12/1958   Great Britain.

RICHARD M. WOOD, *Primary Examiner.*

R. F. STAUBLY, *Assistant Examiner.*